United States Patent
Secatch

(10) Patent No.: US 6,941,393 B2
(45) Date of Patent: Sep. 6, 2005

(54) PUSHBACK FIFO

(75) Inventor: Stacey Secatch, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 306 days.

(21) Appl. No.: 10/091,682

(22) Filed: Mar. 5, 2002

(65) Prior Publication Data

US 2003/0172206 A1 Sep. 11, 2003

(51) Int. Cl.[7] .............................................. G06F 13/00
(52) U.S. Cl. ............................ 710/52; 710/53; 710/54; 710/55; 710/56
(58) Field of Search ............................... 710/53–56, 52

(56) References Cited

U.S. PATENT DOCUMENTS

| | | | | |
|---|---|---|---|---|
| 4,935,894 A | * | 6/1990 | Ternes et al. ................ 710/310 |
| 4,949,301 A | * | 8/1990 | Joshi et al. .................. 711/100 |
| 5,133,062 A | * | 7/1992 | Joshi et al. .................... 703/13 |
| 5,197,144 A | * | 3/1993 | Edenfield et al. ............ 711/143 |
| 5,740,063 A | * | 4/1998 | Nishikawa .................... 702/57 |
| 5,777,987 A | * | 7/1998 | Adams et al. ............... 370/336 |
| 6,044,030 A | * | 3/2000 | Zheng et al. ................ 365/221 |
| 6,222,793 B1 | * | 4/2001 | Matthews .................... 365/236 |
| 6,381,659 B2 | * | 4/2002 | Proch et al. .................. 710/57 |
| 2003/0163763 A1 | * | 8/2003 | DeLano ........................ 714/15 |

* cited by examiner

Primary Examiner—Jeffrey Gaffin
Assistant Examiner—Mohammad Farooq

(57) ABSTRACT

The present invention provides a pushback FIFO architecture that enables a value that has been unloaded from the FIFO to be pushed back into the FIFO at the beginning of the data stream if a determination as made that the data value should not have been unloaded from the FIFO. Therefore, the pushed back data value will be the first data value unloaded from the FIFO on the following read cycle. Because the data value that should not have been unloaded is not lost, and is placed at the beginning of the data value sequence, the pushback FIFO enables speculative unloads of data values from the FIFO to be performed.

9 Claims, 3 Drawing Sheets

PUSHBACK FIFO

TECHNICAL FIELD OF THE INVENTION

The present invention relates to first-in-first-out (FIFO) memory devices and, more particularly, to a FIFO that enables a value that has been unloaded from the FIFO to be pushed back into the FIFO at the beginning of the data stream if a determination as made that the value should not have been unloaded from the FIFO. Therefore, the pushed back value will be the first value unloaded from the FIFO on the following read cycle.

BACKGROUND OF THE INVENTION

A FIFO is a standard implementation of a queue in which data is loaded into the FIFO in a sequence and unloaded from the FIFO in the same sequence in which it was loaded into the FIFO. Informational signals associated with a standard FIFO indicate different conditions of the FIFO, such as whether the FIFO is empty (i.e., whether there is no valid data in the FIFO) and whether it is full (i.e., whether there is no more room in the FIFO and thus no data can currently be written to the FIFO).

With known FIFO architectures, there is no way to execute a speculative unload (i.e., an unload based on a likelihood that the unloaded data will be needed at the time that it is unloaded) because once the data has been unloaded from the FIFO the state of the FIFO is lost. There is no way to reload the data into the FIFO due to the fact that all writes must occur at the end of the input stream of data, rather than at the beginning of the stream of data, which is where the unloaded data would need to be so that it would be the first data read in the next read cycle.

With current FIFO architectures, the FIFO control signals can arrive at the FIFO late without violating timing requirements. This span of time before the FIFO control signals must be valid is of sufficient length to enable a determination to be made as to whether unloading the last data from the FIFO was the proper course of action. In other words, if a speculative unload occurred, a determination could be made as to whether the unloaded data was needed when it was unloaded. However, with current FIFO architectures, speculative unloads are not performed because there is no way to put the data back into the FIFO at the location that it needs to be in the event that the unloaded data was not needed at the time that it was unloaded.

Accordingly, a need exists for a FIFO that enables the last data unloaded from the FIFO to be placed back in the FIFO in such a way that the data placed back in the FIFO is the first data unloaded from the FIFO on the following read cycle. By providing a FIFO with this capability, speculative unloads of data from a FIFO are made possible.

SUMMARY OF THE INVENTION

In accordance with the present invention, a pushback FIFO architecture is provided that enables a data value that has been unloaded from the FIFO to be pushed back into the FIFO at the beginning of the data stream if a determination as made that the data value should not have been unloaded from the FIFO. Therefore, the pushed back data value will be the first data value unloaded from the FIFO on the following read cycle. Because the data value that should not have been unloaded is not lost, and is placed at the beginning of the data value sequence, the pushback FIFO enables speculative unloads of data values from the FIFO to be performed.

These and other features and embodiments of the present invention will be described below with reference to the detailed description, drawings and claims.

DETAILED DESCRIPTION OF THE INVENTION

Figure 1:
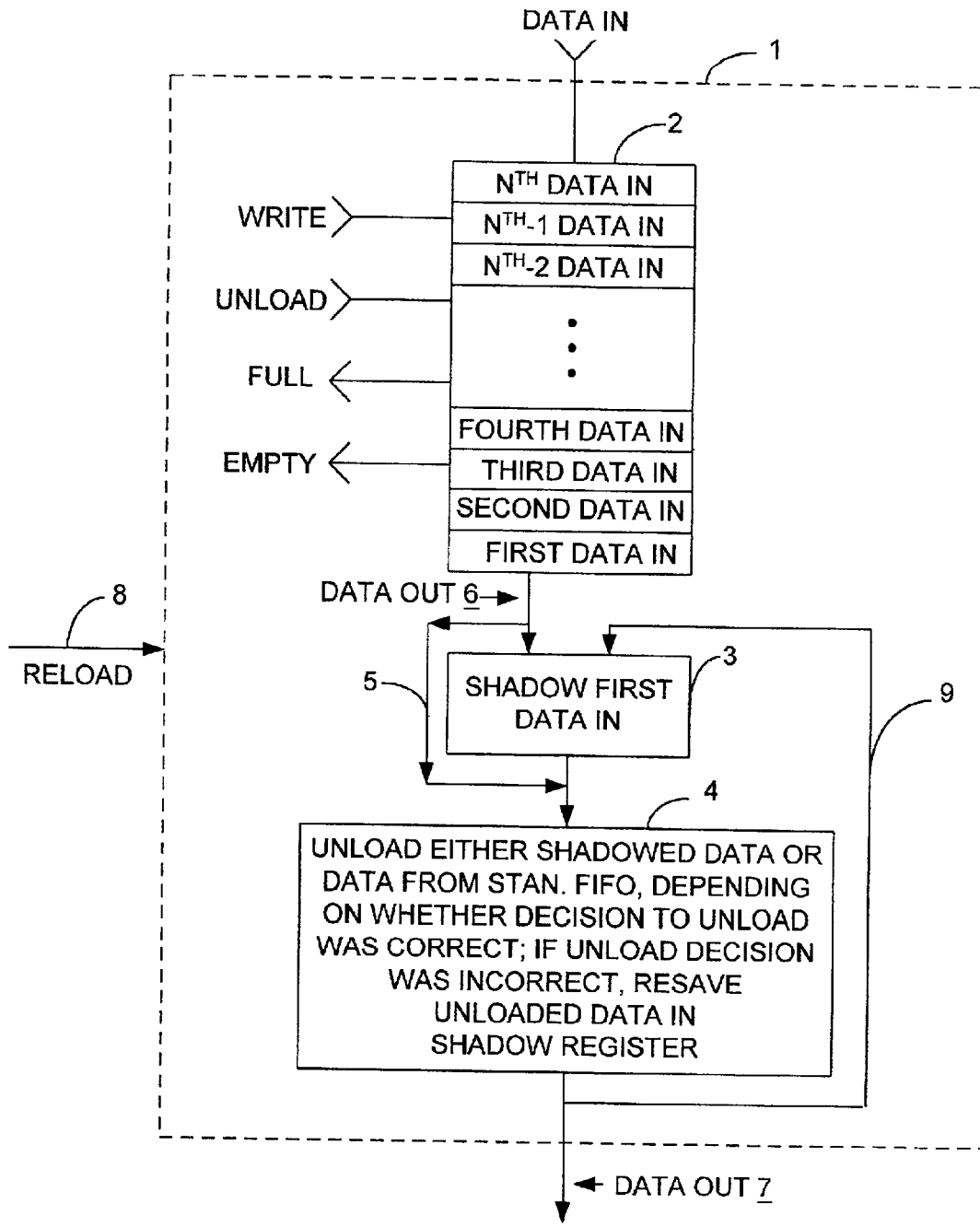
FIG. 1 illustrates a block diagram of an example embodiment of the FIFO of the present invention.

FIG. 1 is a block diagram that illustrates an example embodiment of the pushback FIFO 1 of the present invention. The pushback FIFO 1 comprises a standard FIFO 2, which operates as a typical FIFO. In other words, the data values will be unloaded from the standard FIFO 2 in the same sequence in which they were loaded into the standard FIFO 2. In addition, the pushback FIFO 1 comprises logic 3 and logic 4, which both receive the same data as it is unloaded from the standard FIFO 2, as indicated by arrows 5 and 6. The logic 3 is a storage element that stores, or shadows, the data as it is unloaded from the standard FIFO 2 and from the pushback FIFO 1 as "DATA OUT" 7. The DATA OUT value 7 may be the DATA OUT value 6 or it may by the shadowed data value stored in the storage element of logic 3, depending on whether the value that was unloaded as the DATA OUT value 7 should have been unloaded. The pushback FIFO 1 receives information from a source external to the pushback FIFO that it uses to determine whether the unloaded value should have been unloaded, i.e., whether the unloaded value 7 was needed. This information is in the form of a "RELOAD" signal 8, which also affects the state of the EMPTY flag of the standard FIFO 2. The "RELOAD" signal 8 changes the state of the EMPTY flag such that the pushback FIFO 1 will be marked as having valid data. If the "RELOAD" signal 8 is not asserted, the EMPTY flag will be the value normally generated by FIFO 2. The "RELOAD" signal 8 will not be ignored if there is valid data in the storage element of logic 3 or if the "UNLOAD" signal is also asserted. In essence, the "RELOAD" signal 8 combines with internal state of the architecture comprising the pushback FIFO 1 to affect control of the pushback FIFO 1. The manner in which the "RELOAD" signal 8 affects control of the pushback FIFO will be described below in further detail with reference to FIG. 2.

The state of the "RELOAD" signal 8 enables logic 4 to determine whether or not the unloaded value 7 should have been unloaded. If the "RELOAD" signal 8 is de-asserted, then logic 4 knows that the decision to unload value 7 was correct and that the value in the storage element of logic 3 is no longer valid. If the value unloaded 7 should not have been unloaded, the "RELOAD" signal 8 will be asserted and the logic 4 will cause the same value to be resaved in the storage element of logic 3, as indicated by arrow 9. The term "resaved" is used herein merely to illustrate the point that the value stored in the storage element is still valid, and thus should not be overwritten. In other words, the value need not actually be resaved, but merely flagged as valid data so that it will not be overwritten.

If the decision to unload the value unloaded 7 was correct, the logic 4 will not cause the same value to be resaved in the storage element of logic 3 (the value is not marked as being valid), and on the next read cycle, the next value unloaded from the standard FIFO 2 will be delivered to logic 3 and logic 4 and saved in the storage element of logic 3.

Thus, it can be seen that the pushback FIFO of the present invention enables a speculative unload to occur, which enhances the speed at which data values can be obtained from the FIFO. This feature of the present invention is particularly useful when the FIFO is used to store instructions that are read out of some memory element (not shown) in a stream of instructions that will likely be executed at one per cycle, but may not be.

It should be noted that there are many logical configurations that can be implemented as the logic blocks 3 and 4. Thus, the actual logical configurations that are used to implement logic blocks 3 and 4 are not limited to any particular configurations. Those skilled in the art will understand from the discussion provided herein that a variety of logical configurations can be used for these purposes.

The "WRITE", "UNLOAD", "FULL" and "EMPTY" signals of the standard FIFO 2 are standard as well. When the "FULL" flag is asserted, the "WRITE" signal will be disabled because the standard FIFO 2 is full of data and cannot hold anymore. When the "FULL" flag is asserted, the "UNLOAD" signal may be enabled so that, during a read cycle, the data stored in the standard FIFO 2 is unloaded. When the "EMPTY" flag is asserted, the "WRITE" signal may be enabled so that the standard FIFO 2 is loaded during a write cycle. As mentioned above, the "EMPTY" flag will not be asserted if valid data is stored in the storage element of logic 3.

Figure 2:
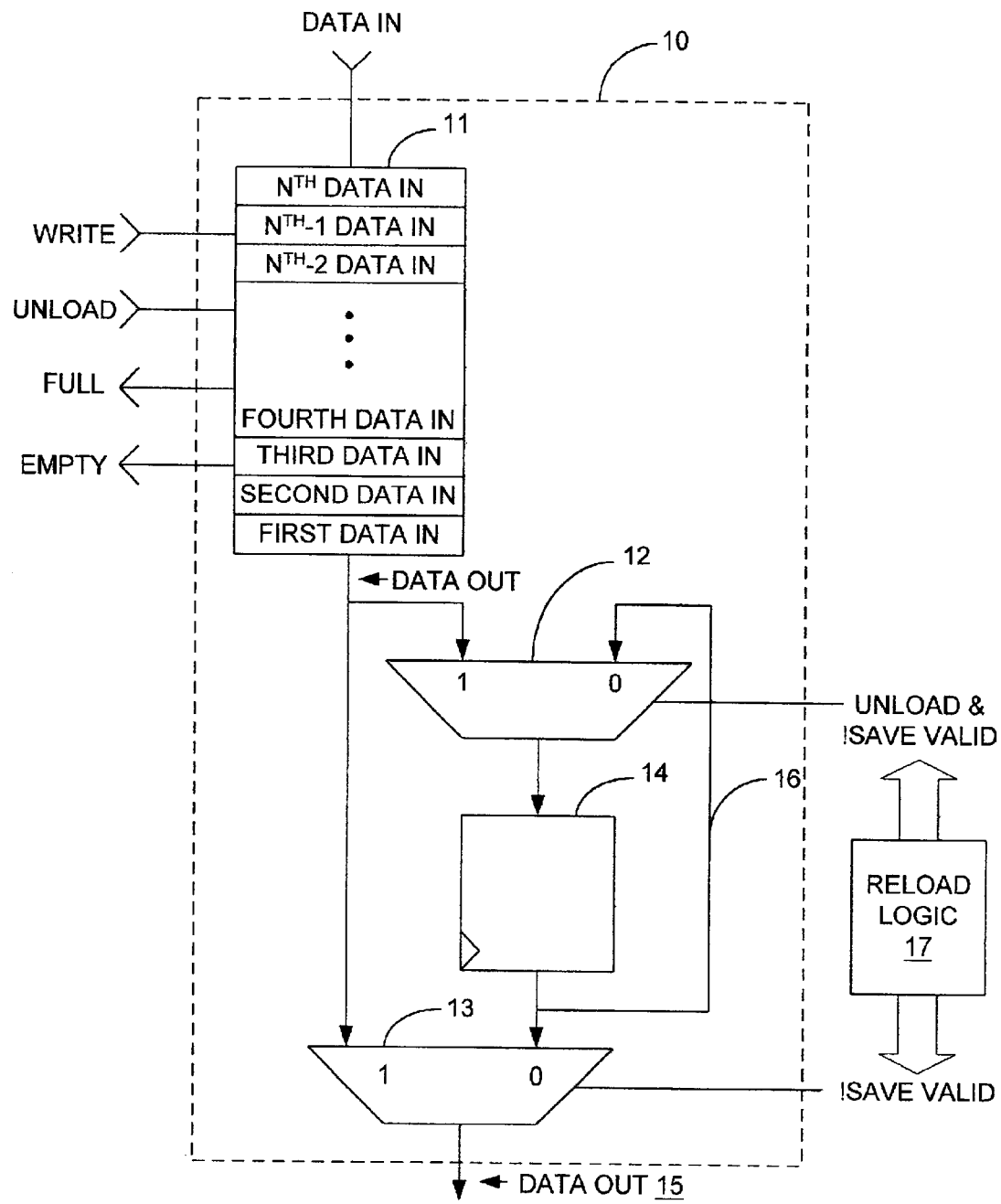
FIG. 2 illustrates a block diagram of another example embodiment if the FIFO of the present invention.

FIG. 2 illustrates a block diagram of a pushback FIFO 10 in accordance with another example embodiment of the present invention, which shows a particular logical configuration for performing the functions of logic blocks 3 and 4 of FIG. 1. The pushback FIFO 10 of FIG. 2 also utilizes a standard FIFO 11, which operates in the same manner as the standard FIFO 2 shown in FIG. 1. When data is unloaded from the standard FIFO 20, the same data is delivered to both the multiplexer 12 and the multiplexer 13. The multiplexer 12 is controlled by an "UNLOAD & !SAVE VALID" signal that is derived locally from past state, the UNLOAD input, and a control signal "RELOAD" that activates the shadow register. The manner in which the RELOAD control signal and the UNLOAD input to the standard FIFO 11 are logically operated on to obtain the "UNLOAD & !SAVE VALID" signal is controlled by RELOAD logic 17. The multiplexer 13 is controlled by a "!SAVE VALID" signal that is derived locally, i.e., from the present state of the UNLOAD signal.

Assuming that no data has been copied into the shadow register 14 at the present point in time, the "UNLOAD & !SAVE VALID" signal will be asserted and the unloaded data from the standard FIFO 11 will be saved in the shadow register 14. The "!SAVE VALID" signal will also be asserted so that the unloaded data from the standard FIFO 11 will be unloaded from the pushback FIFO 10 as "DATA OUT" 15.

If a determination is made by the RELOAD logic 17, which is external to the pushback FIFO 10, that the "DATA OUT" 15 should not have been unloaded, the "UNLOAD & !SAVE VALID" signal will be de-asserted to prevent the next data unloaded from the standard FIFO 11 from being stored in the shadow register 14. At this time, the "!SAVE VALID" signal will also be de-asserted so that the multiplexer 13 will select the data stored in the shadow register 14 to be output as "DATA OUT" 15, rather than the next data to be unloaded from the standard FIFO 11. This ensures that the data in the shadow register 14 is placed back at the beginning of the pushback FIFO stream.

If a determination is then made by the RELOAD logic 17 that the decision to unload the data from the shadow register 14 was incorrect, the external RELOAD logic 17 will cause the "UNLOAD & !SAVE VALID" signal to be de-asserted. This will cause the data at the output of the register 14, which is fed back to the multiplexer 12, as indicated by line 16, to be resaved in the shadow register 14. On the next read cycle, the "!SAVE VALID" signal controlling multiplexer 13 will be asserted so that the multiplexer 13 will select the data stored in the standard FIFO 11 to be output as "DATA OUT" 15, rather than the data stored in the shadow register 14. This process of ensuring that the data in the shadow register 14 is placed back at the beginning of the pushback FIFO 10 stream will continue until a determination is made that the decision to unload the data was correct.

If a determination is made by the RELOAD logic 17 that the decision to unload the data from the shadow register 14 was correct, then the "UNLOAD & SAVE VALID" signal will be asserted to cause the next data unloaded from the standard FIFO 11 to be stored in the shadow register 14 on the next read cycle. At this time, the "!SAVE VALID" signal will be also be asserted so that the multiplexer 13 will select the data stored in the standard FIFO 11 to be output as "DATA OUT" 15, rather than the data stored in the shadow register 14. If a determination is then made that the decision to unload the data from the standard FIFO 11 as "DATA OUT" 15 was correct, then data in the shadow register 14 is no longer valid and the "UNLOAD & !SAVE VALID" signal controlling the multiplexer 12 will be asserted so that the next data value unloaded from the standard FIFO 11 will overwrite the data value currently stored in the shadow register 14. Any "UNLOAD" and "WRITE" signals received by the standard FIFO 11 will be ignored if the "EMPTY" and "FULL" flags are not in the correct states.

Although the "!SAVE VALID" signal that controls the multiplexer 13 is shown as being generated by the "RELOAD" logic 17, which is external to the pushback FIFO 10, the "!SAVE VALID" signal is also derived from the "UNLOAD" signal to the standard FIFO 11 as well as the past state of the "SAVE VALID" signal. However, since both the "UNLOAD" signal and the externally generated "RELOAD" signal are available for use by the RELOAD logic 17 to generate the UNLOAD & SAVE VALID signal that controls the multiplexer 12, both multiplexers 12 and 13 are shown, for illustrative purposes, as being controlled by the external RELOAD logic 17.

Figure 3:
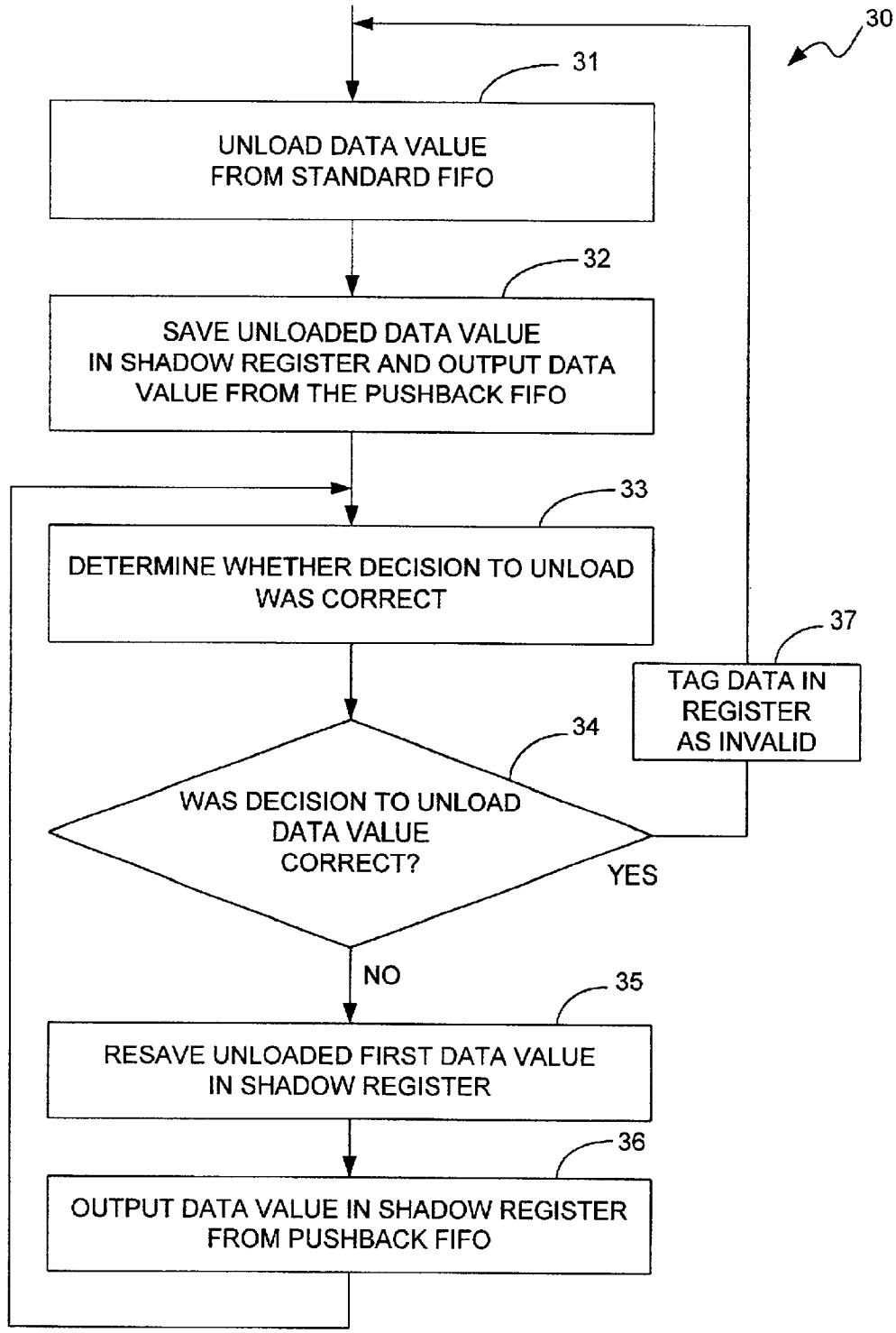
FIG. 3 is a flow chart illustrating an example embodiment of the method of the present invention for performing the pushback FIFO functionality of the present invention.

FIG. 3 is a flow chart illustrating the method 30 performed by the pushback FIFO of the present invention in accordance with an example embodiment for a data value being unloaded from the standard FIFO. The data value is unloaded from the standard FIFO, as indicated by block 31. The data value is simultaneously saved in the shadow register and output from the pushback FIFO, as indicated by block 32. A determination is then made as to whether or not the decision to unload the data was correct, as indicated by block 33. If the decision to unload was not correct, the unloaded data is resaved in the shadow register, as indicated by blocks 33 and 34. Then, when the next read cycle occurs, the data stored in the shadow register is output from the pushback FIFO, as indicated by block 36. The process then returns to block 33 where a determination is made as to whether or not the decision to output the value stored in the shadow register was correct. If a determination is made at block 34 that the decision to unload the data was correct, then the data stored in the shadow register is marked as invalid, as indicated by block 37, and the and then the process begins over again, as indicated by the line connecting block 34 to block 31. Then, in the next read cycle, the next data value will be unloaded from the standard FIFO, stored in the shadow register and output from the pushback FIFO, as indicated by blocks 31 and 32.

It should be noted that the present invention has been described with reference to example embodiments, and that the present invention is not limited to the embodiments described herein. Those skilled in the art will understand, in view of the discussion provided herein, that modifications can be made to the embodiments described above without deviating from the scope of the present invention. For example, although the block diagrams of FIGS. 1 and 2 demonstrate the storage of one data value unloaded from the pushback FIFO, a plurality of registers could be used to store values that are output from the standard FIFO and from the pushback FIFO. In this way, more a multiplicity of speculative unloads could be performed without losing the unloaded data. In this case, only when a data value stored in one of the registers is no longer valid (i.e., the decision to use it was correct) would the data value in that register be overwritten with a data value unloaded from the standard FIFO. Those skilled in the art will understand, in view of the discussion provided herein, the manner in which these and other modifications may be made to the embodiments described herein without deviating from the scope of the present invention.

What is claimed is:

1. A pushback FIFO having an input and an output, the pushback FIFO allowing data values that have been unloaded from the pushback FIFO to be reloaded into the pushback FIFO at the beginning of a sequence of data values stored in the pushback FIFO if a determination is made that a data value should not have been unloaded from the pushback FIFO, the pushback FIFO comprising:

a standard FIFO having a plurality of storage locations for storing data values in a first-in-first-out fashion so that data values can be unloaded from the standard FIFO in a same sequence in which data values were loaded into the standard FIFO;

first logic, the first logic storing a copy of a data value unloaded from the standard FIFO, wherein the first logic includes a first multiplexer having at least first and second inputs and an output, the first input being connected to en output of the standard FIFO, the multiplexer receiving at least one control signal, said at least one control signal controlling whether a data value unloaded from the standard FIFO is to be output from the output of the first multiplexer, wherein the first logic includes a storage element having an input connected to the output of the first multiplexer and an output connected to the second input of the first multiplexer, and wherein said at least one control signal controls whether a data value on the output of the storage element is to be output from the output of the first multiplexer; and second logic, the second logic outputting said data value unloaded from the standard FIFO and, if the data value output from the pushback FIFO should not have been output from the pushback FIFO, the second logic outputs the stored copy of the data value in a subsequent read cycle.

2. The pushback FIFO of claim 1, wherein said determination is made by logic external to the pushback FIFO and provided to the pushback FIFO.

3. The pushback FIFO of claim 1, wherein if a determination is made that the data value unloaded from the pushback FIFO should have been unloaded, the unloaded data value is not reloaded into the pushback FIFO.

4. The pushback FIFO of claim 3, wherein if a determination is made that the data value unloaded from the pushback FIFO should have been unloaded, the unloaded data value is marked as an invalid FIFO data value.

5. The pushback FIFO of claim 1, wherein the second logic further comprises a second multiplexer, the second multiplexer having at least first and second inputs and an output, the first input of the second multiplexer being connected to the output of the standard FIFO and the second input of the multiplexer being connected to the output of the storage element, the second multiplexer being controlled by at least one control signal, and wherein said at least one control signal of the second multiplexer controls whether the data value unloaded from the standard FIFO will be output on the output of the second multiplexer or whether the data value on the output of the storage element will be output on the output of the second multiplexer, the output of the second multiplexer corresponding to the output of the pushback FIFO.

6. The pushback FIFO of claim 5, wherein if a determination is made that a data value unloaded from the pushback FIFO should not have been unloaded, on a next read cycle, the data value stored in the storage element will be output on the output of the second multiplexer and thereby output from the pushback FIFO.

7. The pushback FIFO of claim 5, wherein if a determination is made that a data value unloaded from the pushback FIFO should have been unloaded from the pushback FIFO, then on a next read cycle, a data value stored in the standard FIFO will be output on the output of the second multiplexer and thereby output from the pushback FIFO.

8. The pushback FIFO of claim 7, wherein said at least one control signal received by the first multiplexer determines whether a data value on the first input of the first multiplexer or a data value on the second input of the first multiplexer will be output on the output of the first multiplexer.

9. The pushback FIFO of claim 7, wherein said at least one control signal received by the second multiplexer determines whether a data value on the first input of the second multiplexer or a data value on the second input of the second multiplexer will be output on the output of the second multiplexer and thereby output from the pushback FIFO.

* * * * *